Oct. 31, 1950  H. BRUINING ET AL  2,527,984
METHOD OF MANUFACTURING ELECTRIC DISCHARGE TUBES
Filed July 16, 1946
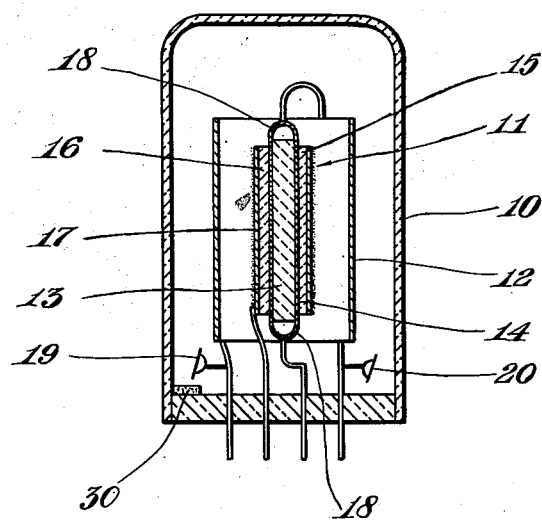
HAJO BRUINING
GONARUS GEEVEN
  INVENTORS.
BY
  *Fred M. Vogel*
  AGENT Patented Oct. 31, 1950

2,527,984

UNITED STATES PATENT OFFICE 2,527,984

METHOD OF MANUFACTURING ELECTRIC DISCHARGE TUBES

Hajo Bruining and Gonarus Geeven, Eindhoven, Netherlands, assignors to Hartford National Bank and Trust Company, Hartford, Conn., as trustee Application July 16, 1946, Serial No. 684,004 In the Netherlands January 15, 1943

Section 1, Public Law 690, August 8, 1946 Patent expires January 15, 1963

2 Claims. (Cl. 315—25)

The invention relates to an electric discharge tube having a thin layer of carbon inside the tube and an electron-emitting cathode layer derived from the decomposition of an alkaline-earth carbonate.

It is known in electric discharge tubes to utilize carbon as a material for electrodes, shields, and the like. In this case the carbon may be present in the form of a solid body, but it is also possible to utilize thin layers, for example of the order of magnitude of 0.1 mm. and smaller. Such thin layers may be used for the heating element of indirectly heated cathodes, these layers being applied onto or inside a ceramic insulating body.

It is also generally known to obtain the active layer of a cathode by applying to the cathode surface a layer of an alkaline-earth carbonate, for example of a mixture of barium carbonate and strontium carbonate, the carbonate decomposing into oxide and carbonic acid being liberated.

It now appears that, in particular when use is made of thin carbon layers which are in close proximity of the cathode or an other electrode and during the manufacture of the tube are heated to a comparatively high temperature, difficulties are involved, which are presumably due to the fact that the carbon layer is chemically attacked by the carbonic acid evolving from the carbonate and is removed wholly or in part by oxidation. This phenomenon causes no difficulty when carbon electrodes or thick carbon layers are concerned, but causes the greater difficulty if use is made of thin carbon layers which are heated to high temperature.

This drawback may be obviated when use is made of the present invention according to which an electric discharge tube which contains a thin carbon layer and in which the active layer of the cathode is obtained by the heating and the decomposition of an alkaline-earth carbonate is treated in such manner that immediately before the decomposition of the carbonate or simultaneously with it a gas-absorbing material susceptible to absorb carbonic acid is vaporised in the tube, and this in such manner that during the heating of the alkaline-earth carbonate a gas-absorbing atmosphere or layer is present in the tube. The term "thin carbon layer" has to be understood to mean layers, the thickness of which is of the order of magnitude of 0.1 mm. and smaller. It is imaginable that with the use of this method the carbonic acid liberated is immediately absorbed, so that there is no danger any more that the carbon layer is removed wholly or in part by oxidation. It appears that this protection of the thin layers here entering into consideration is required only, if the cathode is manufactured in the manner here described, i. e. if comparatively large amounts of gas are set free. Such an oxidation does not occur as a result of the residual gases alone. The tube manufactured by the method of the present invention frequently contains a second gas-absorbing material, in order that, as usual, the last mentioned residual gases after the exhaustion and sealing-off may be absorbed It is also possible, however, to utilize a gas-absorbing material which is vaporized in two portions, viz. at first during the decomposition of the carbonate and then after the exhaustion and sealing-off of the tube during the absorption of the last mentioned residual gases.

Although it is of importance to utilize the method according to the invention in all those cases in which use is made of thin carbon layers, it is preferable to utilize this method with those layers which are in so close proximity of the cathode or another electrode that they are heated to a comparatively high temperature, for example to a temperature of 500° C., when the carbonate is decomposed into oxide.

The invention will now be explained more fully by reference to a practical example in which a method according to the invention is described in detail. In a discharge tube which contains a thin carbon layer serving as a heating element for an indirectly heated cathode and in which the active layer of the cathode is obtained by the heating and the decomposition of an alkaline-earth carbonate, a gas-absorbing material, for example barium, is arranged in a holder secured to a sealed-in conductor. After the system has been arranged in the bulb and the tube exhausted, the carbonate is decomposed by heating and at the same time the barium getter is vaporized. The carbonic acid evolving in the tube is then absorbed by the barium, so that the carbon layer is not chemically attacked. Subsequently, the tube is exhausted and sealed-off in the normal manner.

The discharge tube shown in the drawing comprises within an envelope 10 a cathode assembly 11 and an anode 12. Cathode assembly 11 comprises a refractory core 13 on which is provided a carbon layer 14 serving as the heating element for the cathode assembly. Surrounding the layer 14 is an insulating sleeve 15 and on the sleeve 15 is a conductive metal sheath 16 serving as a base for an alkaline-earth emissive layer 17 derived from an alkaline-earth carbonate as above discussed. The cathode assembly is supported by metal cup-shaped portions 18—18 mounted on the ends of the core 13 and electrically connected to opposite ends of the carbon layer 14, said cup-shaped portions being rigidly supported on and connected to the contact prongs of the tube by wire standards in the usual manner. A getter-cup 19 containing barium is secured to one of the contact prongs whereas an additional getter 20 is secured to another contact prong. The solid reaction product 30 formed of gaseous carbonic acid and the vaporized carbonic acid absorbing material is shown deposited on the tube wall.

What we claim is:

1. An electric discharge tube comprising within an envelope, a cathode electrode having an alkaline-earth carbonate derived active layer, a heating element for said cathode electrode comprising a carbon element in the form of a thin layer, and the solid reaction product of gaseous carbonic acid and of a gaseous carbonic acid absorbing material.

2. An electric discharge tube comprising within an envelope, a cathode electrode having an active surface derived from a mixture of barium carbonate and strontium carbonate, a heating element for said cathode electrode comprising a carbon element in the form of a layer having a thickness of the order of 0.1 mm., and the solid reaction product of gaseous carbonic acid and gaseous barium.

HAJO BRUINING.
GONARUS GEEVEN.

REFERENCES CITED

The following references are of record in the file of this patent:

UNITED STATES PATENTS

| Number | Name | Date |
|---|---|---|
| 1,971,076 | Lowry | Aug. 21, 1934 |
| 2,057,124 | Van Gessel et al. | Oct. 13, 1936 |
| 2,185,832 | Charlton | Jan. 2, 1940 |
| 2,256,101 | Muller | Sept. 16, 1941 |
| 2,260,927 | Atlee | Oct. 28, 1941 |
| 2,341,941 | Mouromtseff | Feb. 15, 1944 |
| 2,362,468 | Clark | Nov. 14, 1944 |